(12) United States Patent
Heiberger et al.

(10) Patent No.: US 11,067,155 B1
(45) Date of Patent: Jul. 20, 2021

(54) SPINDLE DRIVE FOR CURVED PATH OF MOVEMENT

(71) Applicant: Hi-Lex Controls, Inc., Rochester Hills, MI (US)

(72) Inventors: John Heiberger, Grand Blanc, MI (US); Favad Shah, Rochester Hills, MI (US); Ryan Bellaver, Rochester Hills, MI (US); Steve Brinck, Rochester Hills, MI (US)

(73) Assignee: Hi-Lex Controls, Inc., Rochester Hills, MI (US)

( * ) Notice: Subject to any disclaimer, the term of this patent is extended or adjusted under 35 U.S.C. 154(b) by 0 days.

(21) Appl. No.: 16/939,127

(22) Filed: Jul. 27, 2020

(51) Int. Cl.
*F16H 25/20* (2006.01)
*B60J 1/18* (2006.01)

(52) U.S. Cl.
CPC ............ *F16H 25/20* (2013.01); *B60J 1/1853* (2013.01); *F16H 2025/204* (2013.01); *F16H 2025/2031* (2013.01); *F16H 2025/2062* (2013.01)

(58) Field of Classification Search
CPC ............. F16H 25/20; F16H 2025/2031; F16H 2025/204; F16H 2025/2062; B60J 1/1853
See application file for complete search history.

(56) References Cited

U.S. PATENT DOCUMENTS

| | | | |
|---|---|---|---|
| 5,031,270 A | 7/1991 | Lee | |
| 5,214,971 A * | 6/1993 | Burton | B60Q 1/0683 362/528 |
| 6,516,567 B1 * | 2/2003 | Stone | E05F 15/622 296/55 |
| 7,028,573 B2 | 4/2006 | Inaba et al. | |
| 7,185,943 B2 | 3/2007 | Lesle et al. | |
| 7,547,058 B2 * | 6/2009 | King | B60J 5/101 296/146.8 |
| 7,900,530 B2 | 3/2011 | Bochen et al. | |
| 8,403,397 B2 | 3/2013 | Adams et al. | |
| 9,021,905 B2 | 5/2015 | Reif | |
| 9,097,056 B2 | 8/2015 | Kummer et al. | |
| 9,567,786 B2 | 2/2017 | Buchheim et al. | |
| 9,590,467 B2 | 3/2017 | Heinze et al. | |
| 10,180,169 B2 | 1/2019 | Strobel | |
| 10,280,674 B2 | 5/2019 | Leonard et al. | |
| 10,428,572 B2 | 10/2019 | Oster et al. | |
| 2003/0136626 A1 * | 7/2003 | Ciaramitaro | F16D 37/02 192/57 |

(Continued)

FOREIGN PATENT DOCUMENTS

EP 3561336 A1 10/2019
WO 2019/185081 A1 10/2019

*Primary Examiner* — David M Fenstermacher
(74) *Attorney, Agent, or Firm* — Dickinson Wright PLLC

(57) ABSTRACT

A spindle drive assembly includes a threaded spindle rotatable about a spindle axis; a threaded spindle nut disposed on the threaded spindle and configured to travel along the spindle axis via a rotation of the spindle; a ball stud attached to the spindle nut, the ball stud extending radially away from the spindle nut; an attachment plate configured to be attached to a part to be moved; and a ball socket connected to the attachment plate and having a cavity dimensioned for receiving the ball stud. The cavity of the ball socket has a first diameter in a direction perpendicular to the spindle axis and a second diameter parallel to the spindle axis, wherein the first diameter is greater than the second diameter.

18 Claims, 7 Drawing Sheets

(56) References Cited

U.S. PATENT DOCUMENTS

| | | | |
|---|---|---|---|
| 2004/0084265 A1* | 5/2004 | Muller | F16F 9/461 |
| | | | 188/294 |
| 2007/0296243 A1* | 12/2007 | Borrmann | E05F 15/622 |
| | | | 296/146.4 |
| 2009/0266672 A1 | 10/2009 | Scheck | |
| 2011/0290050 A1 | 12/2011 | Kummer et al. | |
| 2012/0000304 A1* | 1/2012 | Hamminga | E05F 15/41 |
| | | | 74/89.23 |
| 2014/0173988 A1* | 6/2014 | Bochen | B60J 5/102 |
| | | | 49/340 |
| 2014/0224045 A1* | 8/2014 | Kummer | F16H 19/02 |
| | | | 74/60 |
| 2015/0096392 A1* | 4/2015 | Garrec | F16C 1/28 |
| | | | 74/89.23 |
| 2015/0300468 A1 | 10/2015 | Ritter et al. | |
| 2017/0138107 A1 | 5/2017 | Müller et al. | |
| 2018/0080532 A1 | 3/2018 | Oster | |
| 2018/0371821 A1 | 12/2018 | Fees et al. | |
| 2019/0323277 A1 | 10/2019 | Schmengler et al. | |
| 2019/0344868 A1* | 11/2019 | Davidson | F16H 25/20 |

* cited by examiner

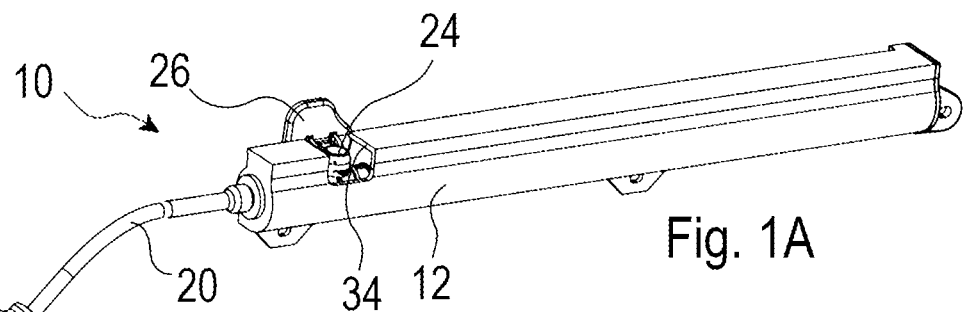
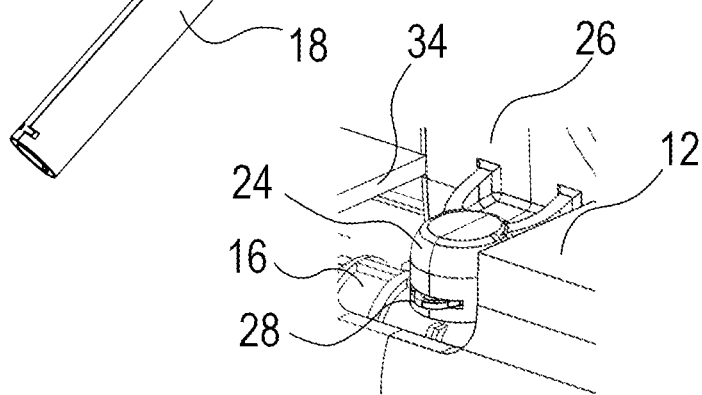
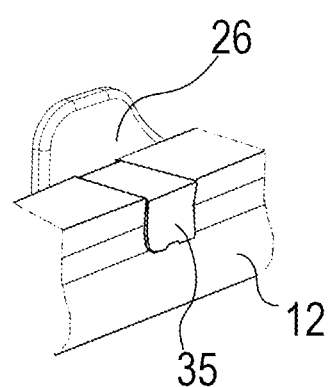
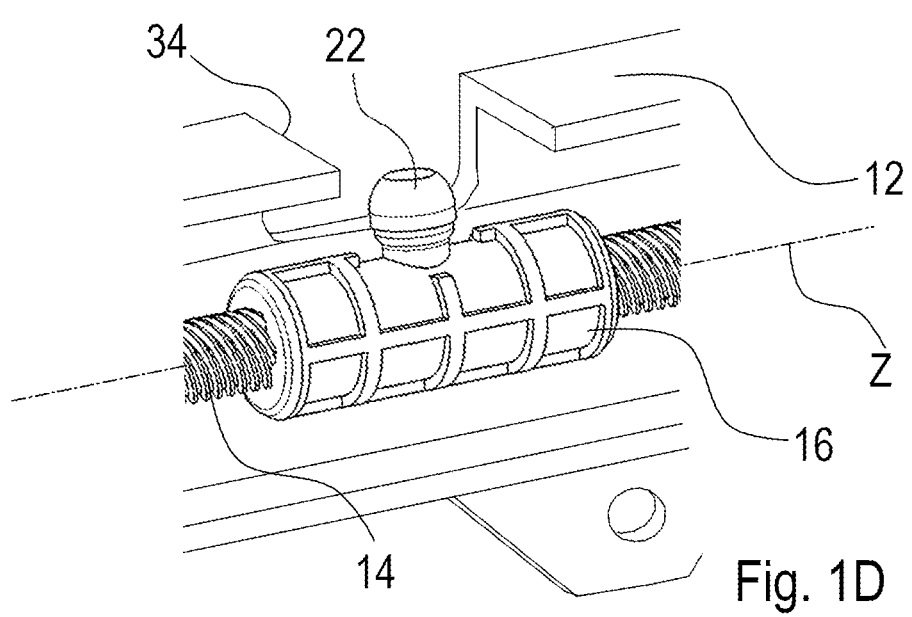
Fig. 1A
Fig. 1B
Fig. 1C
Fig. 1D

SPINDLE DRIVE FOR CURVED PATH OF MOVEMENT

TECHNICAL FIELD

The present disclosure relates to a spindle drive for moving objects along a curved path. Such curved paths are, for example, present in rear slider windows of pickup trucks.

BACKGROUND

In pickup tricks, the driver cabin generally includes a rear sliding window that provide access to the truck bed. Traditionally, if such a sliding window has been powered by a motor, the remotely mounted motor has been coupled to the sliding mechanism via push-pull or pull-pull cables to allow the window to be power opened and closed. Generally, it is possible to effect a linear movement with a spindle drive. But because a rotating threaded spindle is only capable to cause a straight linear movement of a non-rotatable spindle nut sliding along the spindle, a spindle drive is not suited for such rear sliding windows that slide along a curved path.

SUMMARY

The present disclosure describes a spindle drive that is suitable for sliding windows that slide along a curved path.

A spindle drive assembly includes a threaded spindle rotatable about a spindle axis; a threaded spindle nut disposed on the threaded spindle and configured to travel along the spindle axis via a rotation of the spindle; a ball stud attached to the spindle nut, the ball stud extending radially away from the spindle nut; an attachment plate configured to be attached to a part to be moved; and a ball socket connected to the attachment plate and having a cavity dimensioned for receiving the ball stud. This allows the arrangement for accommodating varying angles between the attachment plate and the spindle axis.

The cavity of the ball socket may have a first diameter in a direction perpendicular to the spindle axis and a second diameter parallel to the spindle axis, wherein the first diameter is greater than the second diameter. This arrangement compensates for varying distances between the attachment plate and the ball stud.

The dimensions may be such that the ball stud has a circular horizontal cross-section with a constant diameter, and wherein the first diameter of the cavity is between 10% and 12% greater than the diameter of the ball stud. Further, the respective second diameter of the cavity may be between 0.7% and 1.5% greater than the diameter of the ball stud.

The measurements of the ball stud and cavity may be such that the ball stud has a circular horizontal cross-section with a constant diameter between 8 mm and 12 mm, the first diameter of the cavity is between 1.0 mm and 1.3 mm greater than the diameter of the ball stud, and the second diameter of the cavity is between 0.08 mm and 0.12 mm greater than the diameter of the ball stud.

The ball stud may be secured in the ball socket by an omega clip, wherein the ball socket has a front slot and a rear slot, the front and rear slots being configured to receive the omega clip for securing the ball stud in the cavity.

The spindle drive assembly further comprises a spindle housing that may be open on one lateral side and have a closable cut-out for attaching the ball socket to the ball stud. The open side allows for a movement of the ball socket along the spindle axis when attached to the ball stud.

In one example of the spindle drive assembly, the ball socket is fixedly connected to the attachment plate.

In another example of the spindle drive assembly, the ball socket is movably attached to the attachment plate.

For example, the ball socket may be movable relative to the attachment plate in a direction perpendicular to the spindle axis. The connection between the ball socket and the attachment plate may be established by sliding pins mounted to the attachment plate, and the ball socket is slidable relative to the attachment plate along the sliding pins.

According to another aspect, the spindle nut may be secured against rotation about the spindle axis relative to a spindle housing.

For example, the spindle nut may have a radial projection cooperating with a guide rail formed on an inside surface of the spindle housing.

An electric motor may be operatively connected to the threaded spindle and configured to selectively rotate the spindle about the spindle axis in either one of two rotational directions. A torsion cable may establish the operative connection between the electric motor and the threaded spindle.

Further details and benefits of the present disclosure will become evident from the following description of the accompanying drawings. The drawings are provided for purely illustrative purposes and are not intended to limit the scope of the present invention.

BRIEF DESCRIPTION OF THE DRAWINGS

In the drawings,

FIG. 1A shows a spindle drive assembly with a motor and a spindle housing connected by a torsion cable according, viewed from the side facing the interior of the passenger cabin when installed;

FIG. 1B shows a detail view of the spindle housing with a mounting window closed by a cap;

FIG. 1C shows a detail view of the housing with the mounting window in the spindle housing without the cap according to a first example;

FIG. 1D shows a detail view of the spindle drive assembly of the first example viewed from the side that faces the part to be moved when installed

DETAILED DESCRIPTION OF THE DRAWINGS

Figure 2:
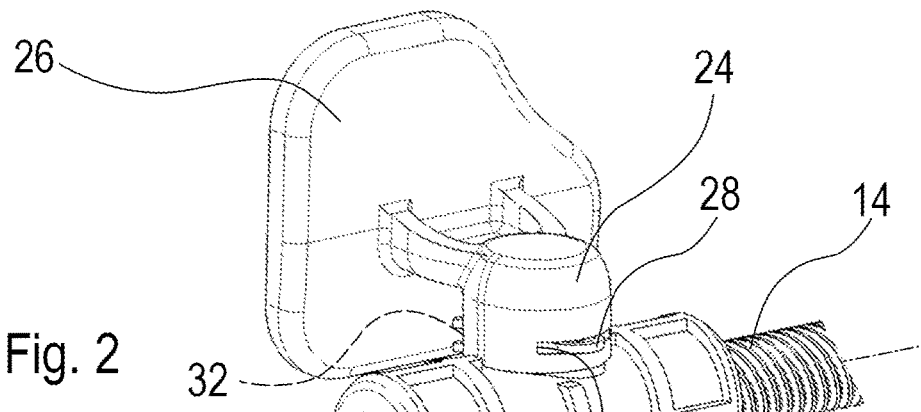
FIG. 2 shows a detail view of a threaded spindle, a spindle nut and a ball-and-socket arrangement of the first example as viewed from the side facing the window when installed.
Figure 3:
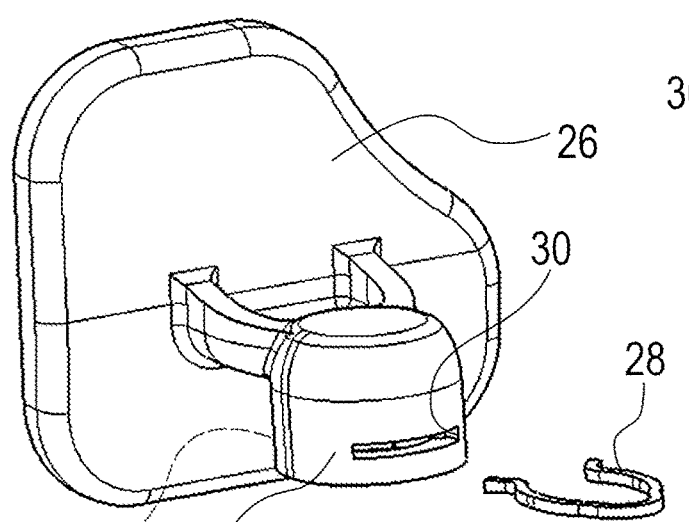
FIG. 3 shows the ball socket formed on an attachment plate of the first example in a disassembled state.
Figure 4:
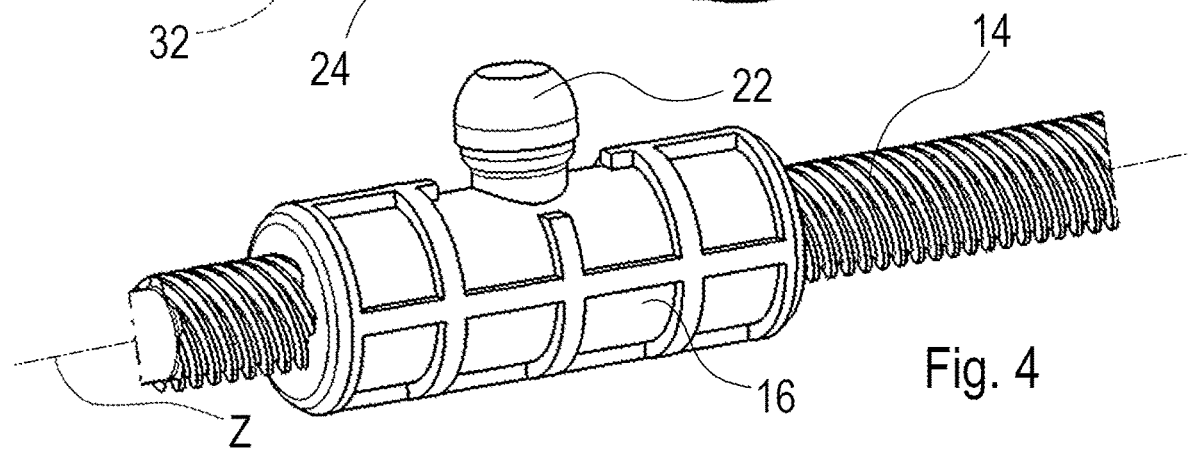
FIG. 4 shows the spindle and the spindle nut with a ball pin of the first example without the ball socket.

In the following description the terms "front," "rear," "top," bottom," and the like are used relative to a horizontal mounting position of the spindle drive in a vehicle cabin to operate a rear-facing window. The terms are not to be interpreted to exclude an installation in a different orientation or environment.

In FIG. 1A, a spindle drive assembly 10 is shown prior to installation in a vehicle. The spindle drive assembly 10 includes a spindle housing 12 accommodating a threaded spindle 14 defining a spindle axis Z, and a spindle nut 16 configured to travel along the spindle axis Z upon rotation of the spindle about the spindle axis Z. FIGS. 1B and 1C show further details of the spindle housing 12, and details of the spindle 14 and the spindle nut 16 are shown in FIGS. 1D and 2-6. An electric motor 18 is operatively connected to the threaded spindle 14. In the shown example, the motor 18 transmits a rotary movement to the threaded spindle 14 via a flexible torsion cable 20, which allows for a variable installation of the motor 18 relative to the spindle housing 12.

In FIG. 1A, the spindle housing is shown from the inside of a vehicle cabin if used of moving a sliding window. The spindle housing 12 is open on the side remote from the viewer as illustrated in FIG. 1D. The open side faces the part to be moved, such as a rear slider window for access from the cabin of a pickup truck to the truck bed.

The spindle nut 16 is monolithically molded with a ball stud 22 extending radially away from the spindle nut 16 as best visible in FIGS. 1D and 4-6. The ball stud 22 cooperates with a ball socket 24 connected to an attachment plate 26 that is configured to be fixedly attached to the part to be moved. For example, the attachment plate 26 may be affixed to a slidable window panel of the rear slider window by an adhesive or by suitable fasteners. In the shown first example, the ball socket 24 is molded onto the attachment plate 26 and thus fixedly connected thereto as evident from FIGS. 2, 3, 5, and 6. The ball stud 22 extends upward, generally parallel to the attachment plate 26, and the ball socket 24 is open on a bottom side to receive the ball stud 22.

Figure 5:
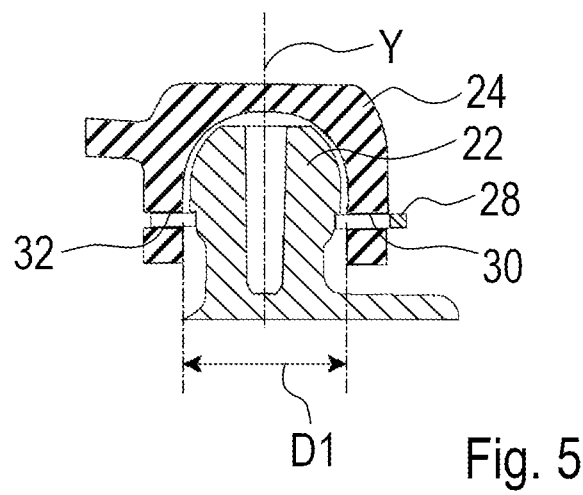
FIG. 5 shows a first cross-sectional view of the ball-and-socket arrangement in a radial plane with respect to the rotary axis of the spindle.
Figure 6:
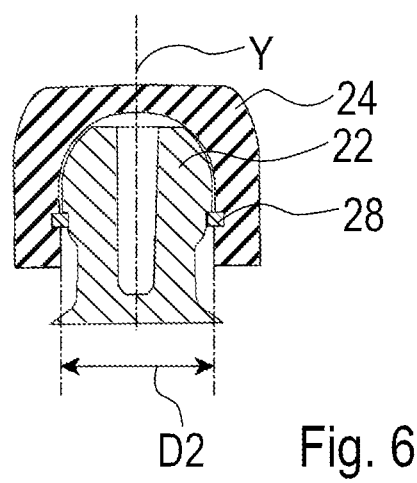
FIG. 6 shows a second cross-sectional view of the ball-and-socket arrangement in an axial plane with respect to the rotary axis of the spindle.

An omega clip 28 is adapted to slide into a front slot 30 formed horizontally in the ball socket 24 on a side remote from the attachment plate 26 and to snap outward behind a rear slot 32 in the ball socket. The omega clip 28 secures the ball stud in the ball socket as shown in FIGS. 5 and 6.

The simple housing 12 has a cut-out 34 near the motor-side end of the spindle 14. The cut-out 34 is dimensioned to allow a vertical insertion of the ball stud 22 into the ball socket 24 during installation of the spindle drive assembly as best seen in FIG. 1C. After the ball stud 22 and the ball socket 24 have been mated, the cut-out 34 is closed with a flexible cap 35 as shown in FIG. 1B.

In order to accommodate a curved path of the slider window, i.e. fora curved slide rail, along which the window panel travels, the ball socket 24 has an oblong internal cavity 36. FIG. 5 illustrates a cross-section of the ball socket 24, the ball stud 22, and omega clip 28 in a radial plane with respect to the spindle axis Z. FIG. 6 shows the same arrangement in a vertical plane parallel to the spindle axis Z. The cavity 36 provides greater play perpendicular to the spindle axis Z than parallel to the spindle axis Z. In one example, the ball stud has a diameter d within the range of 8 mm to 12 mm. The ball stud has a circular horizontal cross-section, having the same diameter d in all horizontal directions. The diameter D1 of the cavity 36 extending perpendicular to the spindle axis is about 1.0 mm to 1.3 mm greater than the diameter d of the ball stud 22, corresponding to a total diameter D1 of 9 mm to 13.3 mm, corresponding to at least 10% play, generally to about 10% to 12% play with respect to the diameter d of the ball stud 22. The diameter D2 parallel to the spindle nut 16 only provides a play of about 0.08 to 0.12 mm, corresponding to only about 0.7% to 1.5% of the diameter d of the ball stud 22. The omega clip 28 is shaped to allow a relative movement of the ball stud 22 within the cavity 36 in the direction perpendicular to the spindle axis Z.

Figure 11:
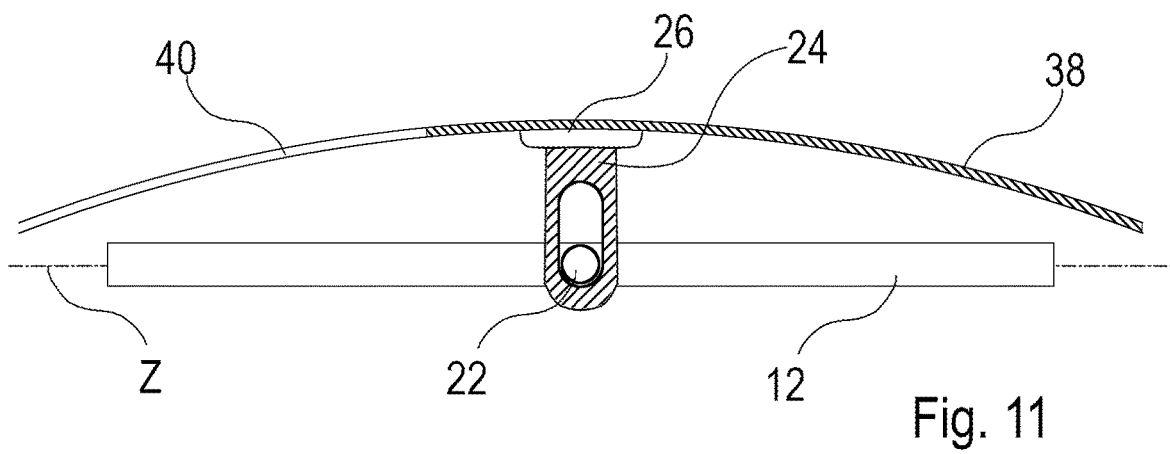
FIGS. 11, 12, and 13 show a schematic illustration of the working principle of the spindle drive of the present disclosure.
Figure 12:
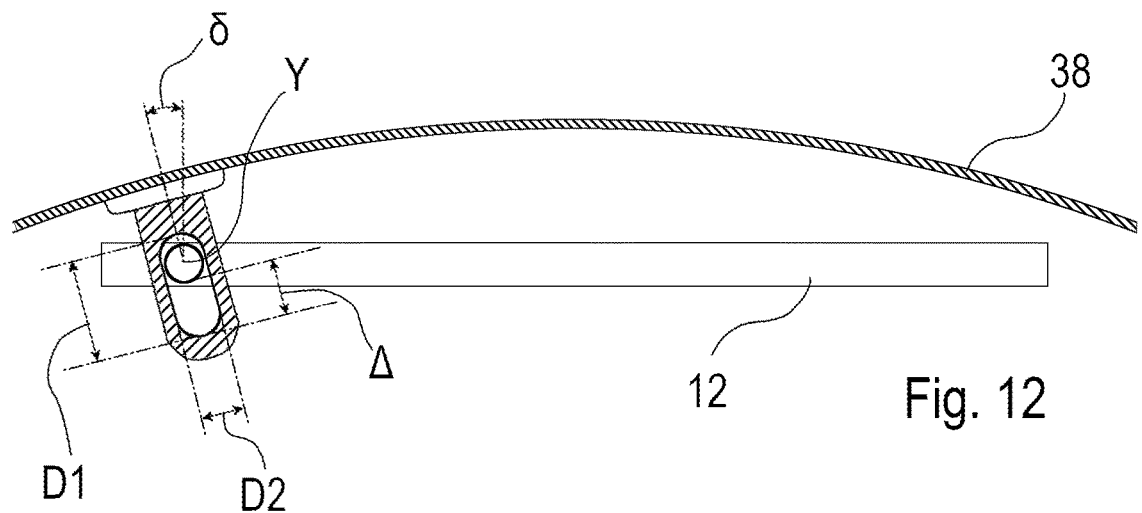
Figure 13:
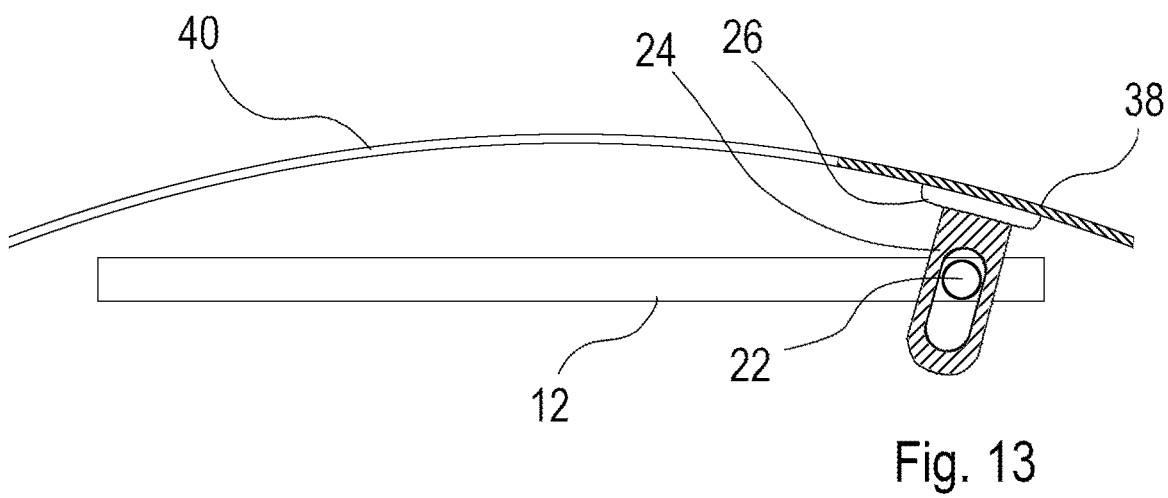

The oblong shape of the cavity 36 accommodates a curved path of movement of the attachment plate as illustrated, in a simplified and exaggerated illustration, in FIGS. 11-13. FIGS. 11-13 show a sliding window panel that is slidable along a curved path defined by a slide rail 40. The attachment plate 26 is affixed to the window panel 38, and the ball socket 24 extending from the attachment plate 26 is shown in a cross-sectional view for illustrative purposes. The ball stud 22 extends from the schematically illustrated spindle housing 12 and is movable long the spindle housing 12. The curvature of the slide rail 40 and the oblong shape of the cavity 36 are exaggerated for better visibility.

In FIG. 11, the ball stud 22 is in a generally central position of its range of movement, where the curved path of the sliding window panel 38 and thus the attachment plate 26 are at the greatest distance from the ball stud 22. Thus, the ball stud is neat the end of the cavity 36 that is remote from the window panel 38. In contrast, FIG. 12 shows the sliding window panel 38 in a closed position. The attachment plate is in a position closer to the ball stud so that the ball stud 22 is now positioned in the cavity 36 near the attachment plate. Additionally, the angle of the attachment plate 26 relative to the spindle housing 12 has changed by an angle δ about a pivot axis Y perpendicular to the image plane. Because the ball stud 22 has a circular horizontal cross-section, the arrangement accommodates this relative rotation between the ball socket 24 and the ball stud 22. FIG. 13 shows the assembly of FIGS. 11 and 12 in the fulling open position of the sliding window panel 38. The position of the ball stud 22 in the cavity 36 of the ball socket 24 corresponds to a mirror image of the fully closed position. It is thus evident that the ball-and-socket arrangement provides two degrees of freedom between the ball stud 22 and the ball socket 24 or, in other words, between the attachment plate 26 and the spindle axis Z: It compensates for both a change A of the distance and a change δ of the angle.

Figure 7:
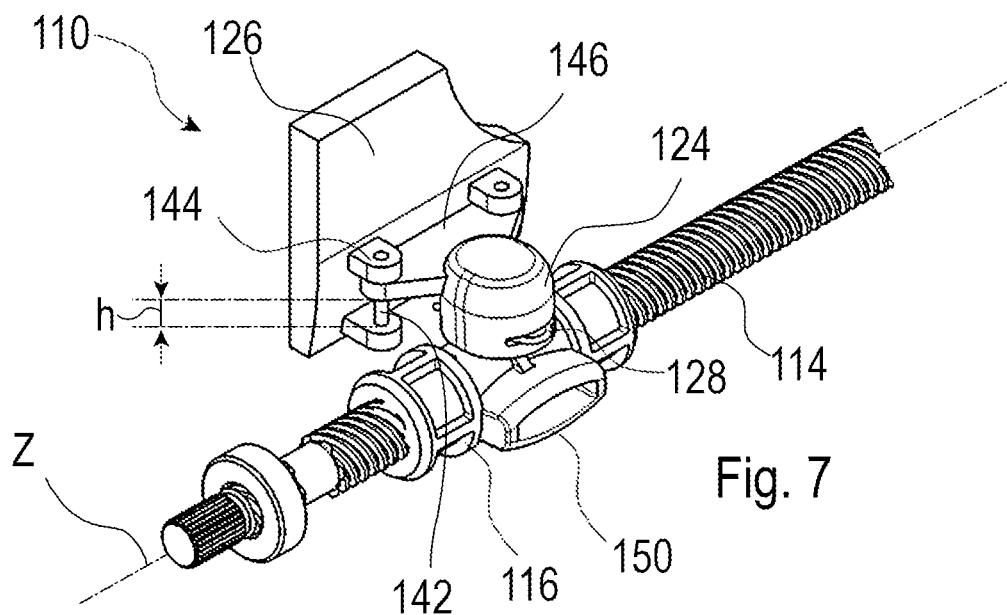
FIG. 7 shows a detail view of a threaded spindle, a spindle nut and a ball-and-socket arrangement of a second example as viewed from the side facing the interior of the passenger cabin when installed.
Figure 8:
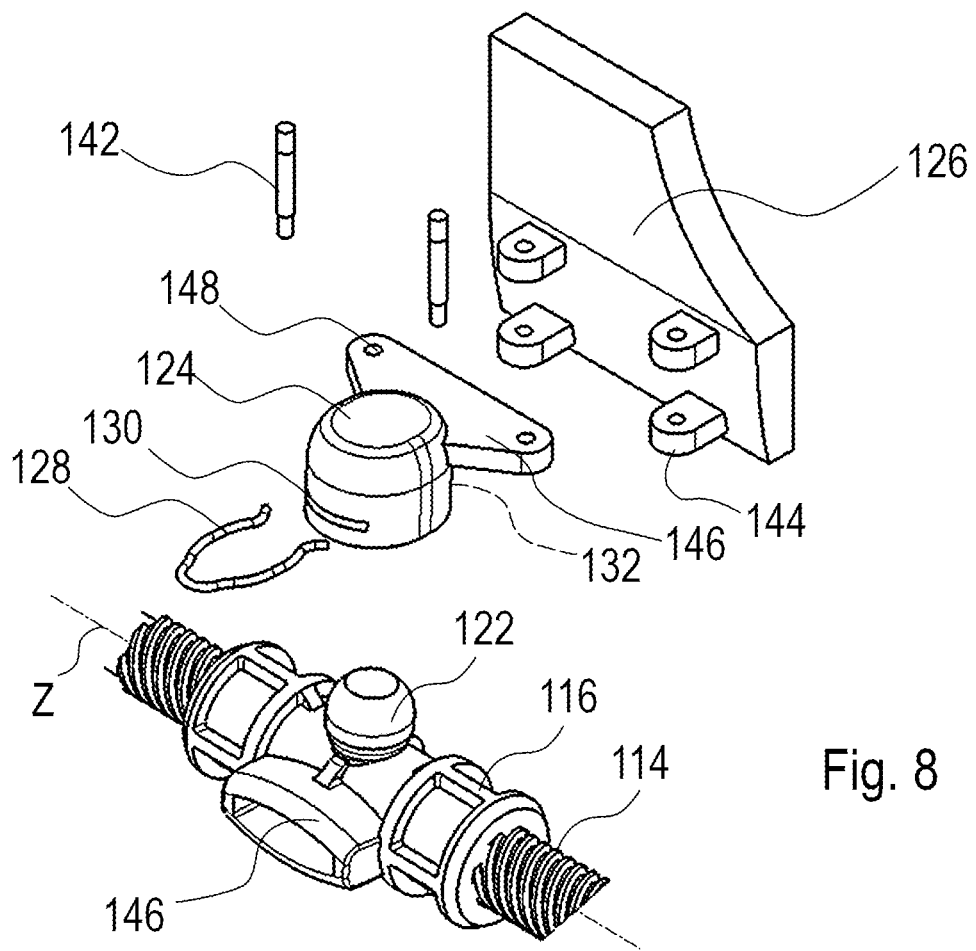
FIG. 8 show the elements of FIG. 7 in an exploded view.
Figure 9:
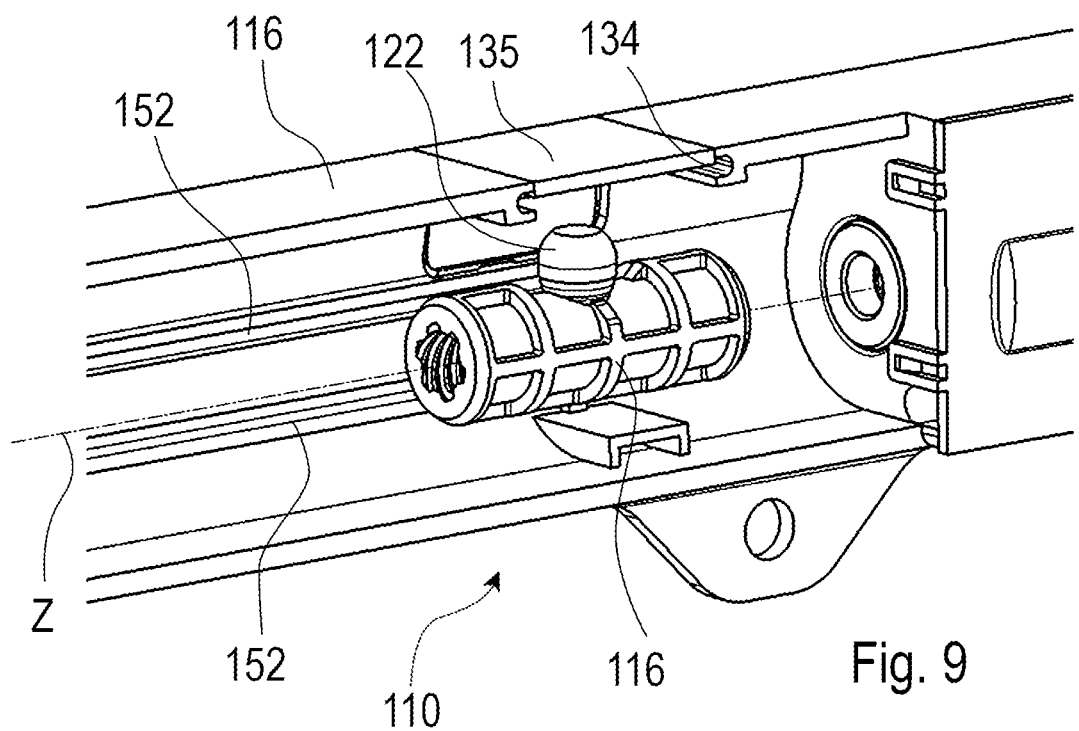
FIG. 9 shows a detail view of the position of a spindle nut of the second example in the housing as viewed from the side facing the window when installed.
Figure 10:
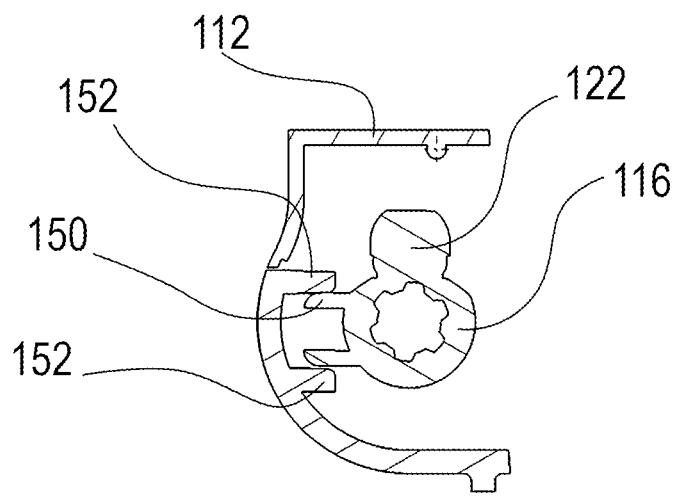
FIG. 10 shows a cross-sectional view of the spindle nut of the second example guided in the housing in a plane perpendicular to the direction of movement of the spindle nut.

A second example of a spindle drive assembly 110 according to the present disclosure is shown in FIGS. 7-10. The second example provides all of the benefits of the first example as illustrated in FIGS. 11-13 in addition to further technical advantages. Details of the spindle 114, the spindle nut 116, the ball stud 122, the ball socket 124, and the attachment plate 126 are shown in FIGS. 7 and 8, while FIGS. 9 and 10 show details of the spindle nut 116 arranged in the spindle housing 112.

The spindle nut 116 is monolithically molded with a ball stud 122 extending upward, radially away from the spindle nut 116 as best visible in FIGS. 8-10. The ball stud 122 cooperates with a ball socket 124 connected to an attachment plate 126 that is configured to be fixedly attached to the part to be moved, for example a slidable window panel.

In the shown second example, the ball socket 124 is attached the attachment plate 126 via two sliding pins 142 that are arranged in parallel to each other and extend vertically. The sliding pins are knurled at their ends for a secure retention within holding loops 144 formed on the attachment plate 126. The ball socket 124 includes a horizontal tongue 146 with vertical through-holes 148 adapted to receive the sliding pins 142. These details are best visible in FIGS. 7 and 8. The ball stud 122 extends upward, generally parallel to the attachment plate 126, and the ball socket 124 is open on a bottom side to receive the ball stud 122. To maintain the upward direction of the ball stud 122, the spindle nut 116 has a horizontally extending radial protrusion 150 that is visible in FIGS. 7, 8, and 10. The protrusion 150 is sized to cooperate with a guide rail 152 formed on the inside of the spindle housing 112 as shown in FIGS. 9 and 10. The protrusion 150 and the guide rail 152 form an anti-rotation feature for the spindle nut 116.

As the rotation of the spindle nut 116 about the spindle axis Z is restrained, the sliding pins 142 provide additional vertical play for the ball socket 124 that facilitates the assembly of the spindle drive assembly 110. The sliding pins further reduce the risk of jamming as the spindle nut travels along the spindle axis Z. The vertical play h of the tongue 146 along the sliding pins 142 is within the range of 5 mm to 8 mm.

An omega clip 128 is adapted to slide into a front slot 130 formed horizontally in the ball socket 124 on a side remote from the attachment plate 26 and to snap outward behind a rear slot 132 in the ball socket, in analogy with the first example. The omega clip 128 secures the ball stud in the ball socket as shown in FIG. 7.

As shown in FIG. 9, the spindle housing 112 has a cut-out 134 near the motor-side end of the spindle 14. The cut-out 134 is dimensioned to allow a vertical insertion of the ball stud 122 into the ball socket 124 during installation of the spindle drive assembly 110. After the ball stud 122 and the ball socket 124 have been mated, the cutout 134 is closed with a flexible cap 135.

In order to accommodate a curved path of a slider window, i.e. for a curved slide rail, along which the window panel travels, the ball socket 124 also has an oblong internal cavity as illustrated and described above in connection with FIGS. 5 and 6. The omega clip 128 is shaped to allow a relative movement of the ball stud 122 within the cavity in the direction perpendicular to the spindle axis Z.

Thus, the second example provides all of the degrees of freedom of the first example between the attachment plate 126 and the spindle axis Z: It compensates for both a change A of the distance and a change δ of the angle as illustrated in FIGS. 11-13. Additionally, the second example further provides a vertical degree of freedom between the attachment plate 126 and the spindle axis Z by allowing the ball socket 124 to slide along the sliding pins 142 by the distance h. The translatory degrees of freedom are both in directions perpendicular to the spindle axis Z so that the position of the attachment plate 126 along the spindle axis Z remains well defined. The rotational degree of freedom is also provided perpendicular to the spindle axis about an axis Y, while the rotation of the spindle nut about the spindle axis Z is limited by the protrusion 150 and the guide rail 152.

It should be noted that the spindle nut 16 with the ball stud 22 of the first example may be used with the attachment plate 126 and the ball socket 124 of the second example and vice versa.

Figure 14:
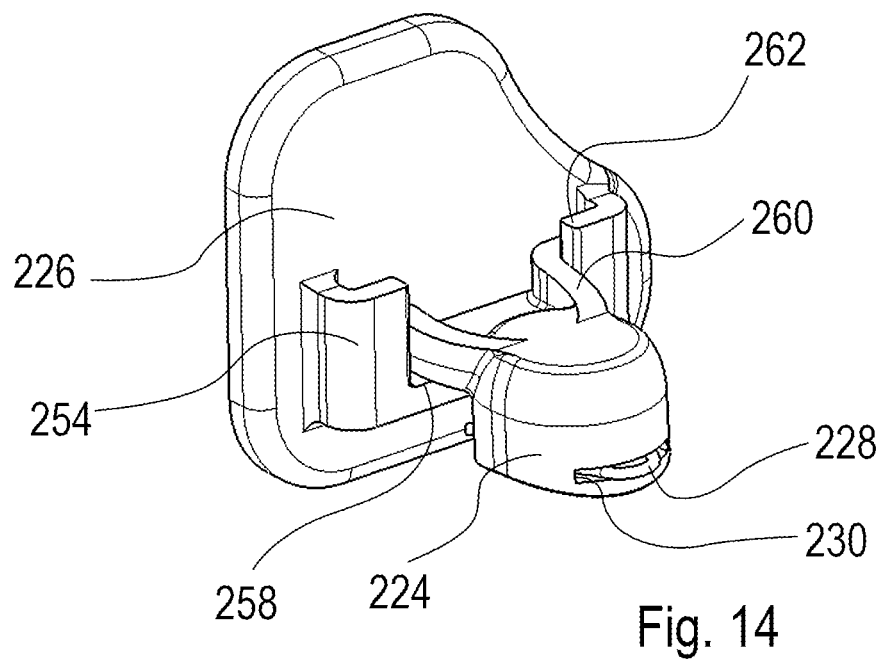
FIG. 14 shows a further example of an attachment plate with ball socket in a connected state.
Figure 15:
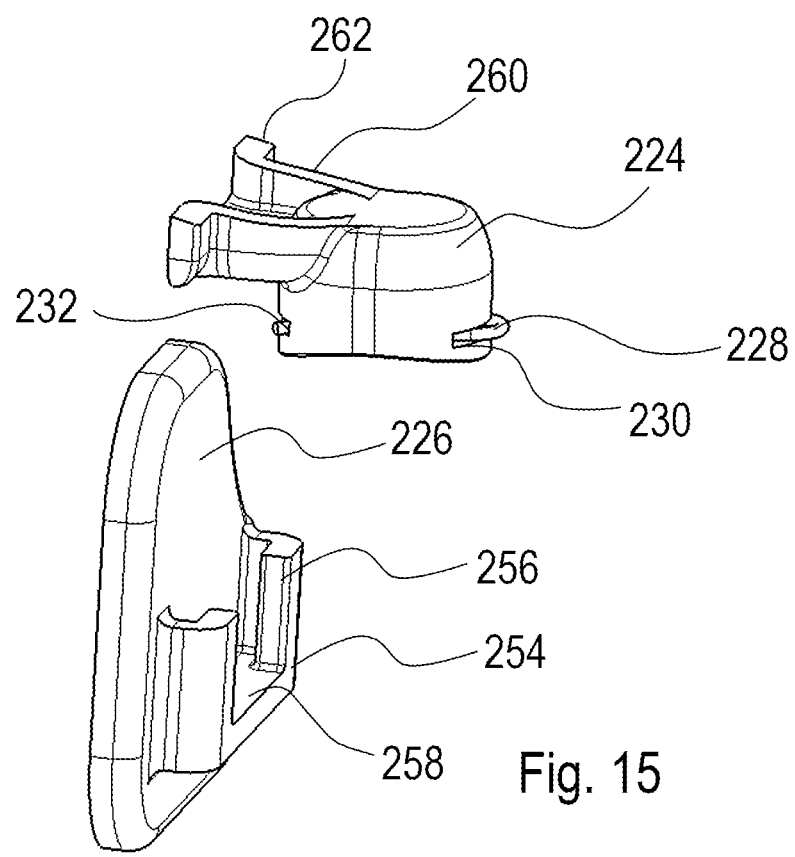
FIG. 15 shows the example of FIG. 13 in a disconnected state.

FIG. 13 shows a third example of an attachment plate 226 with a ball socket 224 in a connected state, and FIG. 14 shows the third example in a disconnected state. The shown arrangement of the attachment plate 226 and the ball socket 224 may be used in lieu of the attachment plate 126 and the ball socket 124 of the second example or of the attachment plate 26 and the ball socket 24 of the first example.

The third example provides all of the degrees of freedom of the first and second examples between the attachment plate 226 and the spindle axis Z: It compensates for both a change A of the distance and a change δ of the angle as illustrated in FIGS. 11-13. Additionally, like the second example, the third example further provides a vertical degree of freedom between the attachment plate 226 and the spindle axis Z by allowing the ball socket 124 to slide vertically relative to the attachment plate 226. For enabling the vertical movement, the attachment plate has a retention pocket 254 for slidably receiving angled end portions 262 of a retention extension 260 formed on the ball socket 224. The retention pocket 254 includes two parallel vertical retention rails 256 for slidably guiding the angled end portions 262 of the retention extension 260. While the retention extension 260 is shown as two retention arms, the retention extension 260 may be tongue-shaped as shown in the second example or be a protrusion of a different shape without departing from the scope of the present invention. In contrast to the second example, the upward movement of the ball socket 224 relative to the attachment plate 226 in not structurally limited. It is thus possible to attach the attachment plate 226 to the part to be moved and to install the spindle housing 12 in the intended mounting position before connecting the ball socket to both the attachment plate 226 and the ball stud 22 or 122 by lowering the ball socket to engage the retention pocket 254 with the retention extension and the ball stud with the ball socket. By inserting the omega clip 228 into the front slot of the ball socket and securing it from slipping out by engaging the omega clip with the rear slot 232, the ball socket 224 is vertically locked on the ball stud 22 or 122 and cannot slip out of the retention pocket 254 on the attachment plate 226.

Like in the second example, the translatory degrees of freedom are both in directions perpendicular to the spindle axis Z so that the position of the attachment plate 226 along the spindle axis Z remains well defined. The rotational degree of freedom is also provided perpendicular to the spindle axis about an axis Y.

While the above description constitutes the preferred embodiments of the present invention, the invention is susceptible to modification, variation and change without departing from the proper scope and fair meaning of the accompanying claims. Individual features of the second example may be implemented in the first example, such as the anti-rotation feature or the vertical slidability of the ball socket, without departing from the scope of the present invention. Likewise, individual features of the first example may be implemented in the second example, such as the torsion cable or the motor, without departing from the scope of the present invention.

What is claimed is:
1. A spindle drive assembly comprising:
a threaded spindle rotatable about a spindle axis;

a threaded spindle nut disposed on the threaded spindle and configured to travel along the spindle axis via a rotation of the spindle;

a ball stud attached to the spindle nut, the ball stud extending radially away from the spindle nut;

an attachment plate configured to be attached to a part to be moved; and a ball socket connected to the attachment plate and having a cavity dimensioned for receiving the ball stud.

2. The spindle drive assembly according to claim 1, further comprising an omega clip, wherein the ball socket has a front slot and a rear slot, the front and rear slots being configured to receive the omega clip for securing the ball stud in the cavity.

3. The spindle drive assembly according to claim 1, further comprising a spindle housing, wherein the spindle housing is open on one lateral side and has a closable cut-out for attaching the ball socket to the ball stud.

4. The spindle drive assembly according to claim 1, wherein the ball socket is fixedly connected to the attachment plate.

5. The spindle drive assembly according to claim 1, wherein the ball socket is movably attached to the attachment plate.

6. The spindle drive assembly according to claim 1, further comprising a spindle housing, wherein the spindle nut is secured against rotation about the spindle axis relative to the spindle housing.

7. The spindle drive assembly according to claim 6, wherein the spindle nut has a radial projection cooperating with a guide rail formed on an inside surface of the spindle housing.

8. The spindle drive assembly according to claim 1, further comprising an electric motor operatively connected to the threaded spindle and configured to selectively rotate the spindle about the spindle axis in either one of two rotational directions.

9. The spindle drive assembly according to claim 8, further comprising a torsion cable operatively connecting the electric motor to the threaded spindle.

10. A spindle drive assembly comprising:

a threaded spindle rotatable about a spindle axis;

a threaded spindle nut disposed on the threaded spindle and configured to travel along the spindle axis via a rotation of the spindle;

a ball stud attached to the spindle nut, the ball stud extending radially away from the spindle nut;

an attachment plate configured to be attached to a part to be moved; and a ball socket connected to the attachment plate and having a cavity dimensioned for receiving the ball stud, wherein the cavity of the ball socket has a first diameter in a direction perpendicular to the spindle axis and a second diameter parallel to the spindle axis, wherein the first diameter is greater than the second diameter.

11. The spindle drive assembly according to claim 10, wherein the ball stud has a circular horizontal cross-section with a constant diameter, and wherein the first diameter of the cavity is between 10% and 12% greater than the diameter of the ball stud.

12. The spindle drive assembly according to claim 10, wherein the ball stud has a circular horizontal cross-section with a constant diameter, and wherein the second diameter of the cavity is between 0.7% and 1.5% greater than the diameter of the ball stud.

13. The spindle drive assembly according to claim 10, wherein the ball stud has a circular horizontal cross-section with a constant diameter between 8 mm and 12 mm, and wherein the first diameter of the cavity is between 1.0 mm and 1.3 mm greater than the diameter of the ball stud.

14. The spindle drive assembly according to claim 10, wherein the ball stud has a circular horizontal cross-section with a constant diameter between 8 mm and 12 mm, and wherein the second diameter of the cavity is between 0.08 mm and 0.12 mm greater than the diameter of the ball stud.

15. A spindle drive assembly comprising:

a threaded spindle rotatable about a spindle axis;

a threaded spindle nut disposed on the threaded spindle and configured to travel along the spindle axis via a rotation of the spindle;

a ball stud attached to the spindle nut, the ball stud extending radially away from the spindle nut;

an attachment plate configured to be attached to a part to be moved; and a ball socket connected to the attachment plate and having a cavity dimensioned for receiving the ball stud, wherein the ball socket is connected to the attachment plate to be movable relative to the attachment plate in a direction perpendicular to the spindle axis.

16. The spindle drive assembly according to claim 15, wherein the ball socket is connected to the attachment plate to be slidable relative to the attachment plate.

17. The spindle drive assembly according to claim 16, wherein the ball socket is slidable relative to the attachment plate along sliding pins mounted to the attachment plate.

18. The spindle drive assembly according to claim 16, wherein the ball socket is slidable relative to the attachment plate along retention rails formed on the attachment plate, wherein the retention rails allow a for a sliding insertion and removal of a retention extension of the ball socket.

* * * * *